United States Patent [19]

Swaminathan

[11] Patent Number: 4,956,871

[45] Date of Patent: Sep. 11, 1990

[54] IMPROVING SUB-BAND CODING OF SPEECH AT LOW BIT RATES BY ADDING RESIDUAL SPEECH ENERGY SIGNALS TO SUB-BANDS

[75] Inventor: Kumar Swaminathan, Randolph, N.J.

[73] Assignee: AT&T Bell Laboratories, Murray Hill, N.J.

[21] Appl. No.: 252,250

[22] Filed: Sep. 30, 1988

[51] Int. Cl.$^5$ .............................................. G10L 7/02
[52] U.S. Cl. ...................................................... 381/31
[58] Field of Search ..................................... 381/29-40, 381/41; 364/513.5; 375/122, 25-26, 34

[56] References Cited

U.S. PATENT DOCUMENTS

| | | | |
|---|---|---|---|
| 4,538,234 | 8/1985 | Honda et al. | 364/513.5 |
| 4,569,075 | 2/1986 | Nussbaumer | 381/29 |
| 4,622,680 | 11/1986 | Zinser | 375/25 |
| 4,790,016 | 12/1988 | Mazor et al. | 381/39 |
| 4,811,398 | 3/1989 | Copperi et al. | 381/37 |

OTHER PUBLICATIONS

Ramstad, "Sub-Band Coder with a Simple Adaptive Bit Allocation Algorithm", ICASSP 82, pp. 203–207.
*IRE Transactions on Information Theory*, vol. IT-6, Mar. 1960, "Quantizing for Minimum Distortion", Joel Max, pp. 7–12.

*Primary Examiner*—Gary V. Harkcom
*Assistant Examiner*—John A. Merecki
*Attorney, Agent, or Firm*—Alfred G. Steinmetz

[57] ABSTRACT

A sub-band speech coding arrangement divides the speech spectrum into sub-bands and allocates bits to encode the time frame interval samples of each sub-band responsive to the speech energies of the sub-bands. The sub-band samples are quantized according to the sub-band energy bit allocation and the time frame quantized samples and speech energy signals are coded. A signal representative of the residual difference between the each time frame interval speech sample of the sub-band and the corresponding quantized speech sample of the sub-band is generated. The quality of the sub-band coded signal is improved by selecting the sub-bands with the largest residual differences, producing a vector signal from the sequence of residual difference signals of each selected sub-band, and matching the sub-band vector signal to one of a set of stored Gaussian codebook entries to generate a reduced bit code for the selected vector signal. The coded time frame interval quantized signals, speech energy signals and reduced bit codes for the selected residual differences are combined to form a multiplexed stream for the speech pattern of the time frame interval.

22 Claims, 9 Drawing Sheets

IMPROVING SUB-BAND CODING OF SPEECH AT LOW BIT RATES BY ADDING RESIDUAL SPEECH ENERGY SIGNALS TO SUB-BANDS

FIELD OF INVENTION

The invention relates to digital speech communication and more particularly to sub-band coding arrangements for reducing the transmission rate of digital speech signals.

BACKGROUND OF THE INVENTION

Sub-band coding of digital speech signals provides a relatively simple but efficient technique to reduce the bit rate required for digital transmission of speech. As is well known, a speech signal to be digitally encoded is sampled at a rate corresponding to twice its bandwidth and each sample is converted to a multibit digital code. Therefore, the transmission rate of the digital codes exceeds the sampling rate of the speech signal by a factor corresponding to the number of bits in each digital code. With sub-band coding, the spectrum of the speech signal over a short time interval is partitioned into a plurality of substantially lower bandwidth sub-bands so that each sub-band need be sampled at only twice the lower bandwidth. Since each sub-band contains less information than the entire spectrum of the speech signal, the encoding may be made more specific to the sub-band and the transmission rate for the sub-band may be reduced. Consequently, the overall bit rate of the multiplexed sub-band digital codes representing the speech and the resulting transmission rate are lowered without affecting the perceived quality of the decoded speech signal.

While a substantial bit rate reduction is achieved by known sub-band coding arrangements, some systems require a further reduction to accommodate limited transmission channels. Adaptive differential pulse code modulation or adaptive predictive coding have been employed to encode each sub-band such as described in U.S. Pat. Nos. 4,538,234, issued to Honda et al Aug. 27, 1985, and 4,622,680 issued to R. L. Zinser Nov. 11, 1986, to provide an even lower bit rate by taking advantage of redundancy reduction in the sub-bands. Such arrangements, however, make the coding apparatus more complex, more expensive and very sensitive to transmission errors. Since communication systems using radio type channels are characterized by bursts of errors, ADPCM or APC coding cannot be used effectively. An alternative is to employ only dynamic bit allocation such as described in the article "Sub-Band Coder with Simple Adaptive Bit-Allocation Algorithm: A Possible Candidate for Digital Mobile Telephony" by Tor A. Ramstad appearing in the 1982 *Proc. International Conference on Acoustics, Speech and Signal Processing*, pp. 203–207 to obtain a large bit rate reduction. Dynamic bit allocation by itself, however, is not sufficient to insure good speech quality at low bit rates, e.g., 12 Kbps. As a result, impaired performance is experienced.

U.S. Pat. No. 4,538,234, issued to Honda et al. Aug. 27, 1985, discloses an adaptive predictive processing system using adaptive bit allocation in which a speech signal is split into a plurality of bands. Each sub-band portion of the speech is subjected to adaptive predictive coding and adaptively changing quantization characteristics in the predictive coding to reduce quantizing noise. An average amplitude of the signal of each band is detected for each time interval to reduce the hardware requirements. Systems employing speech coding such as cellular telephone require very low bit rates to meet the requirements of limited bandwidth and to permit incorporation of error correction adapted to the burst noise characteristics of the channel. In such systems, adaptive predictive coding even with bit allocation may not provide sufficiently low bit rates and does not achieve robust performance in the presence of channel errors.

If only dynamic bit allocation is used to obtain robust performance, the limited number of bits allocated to the sub-bands results in some sub-bands having no allocated bits in particular time frame intervals. The phenomenon of no allocated bits for a sub-band occurring irregularly in the sequence of time frame intervals causes chirp-like artifacts in the decoded speech which detracts from the intelligibility of the decoded speech. It is an object of the invention to provide improved sub-band coding at very low bit rates with a reduction of the detracting chirp-like artifacts.

SUMMARY OF THE INVENTION

The foregoing object is achieved by forming residual signals for each sub-band, selecting sub-bands with large quantizing errors and transmitting coded signals representing the residual signals of the selected sub-bands to reduce the chirp-like artifacts due to irregular sub-band bit patterns.

The invention is directed to sub-band speech coding arrangements in which a predetermined number of bits is allocated to each sub-band portion of the speech spectrum in every time frame interval of the speech according to the relative magnitude of speech energy of the sub-band. Responsive to sub-band energy representative signals and the number of bits allocated to the sub-band, the time frame interval speech samples of the sub-band are quantized. The quantized speech samples and the speech energy signals of the plurality of sub-bands of the time frame interval are combined into a multiplexed stream. A signal representative of the residual difference between the each time frame interval speech sample of the sub-band and the corresponding quantized speech sample is generated. One or more of the sub-bands are selected responsive to the magnitudes of the time frame interval residual differences for the sub-bands and coded signals each corresponding to the sequence of residual difference signals of a selected sub-band are produced and applied to the multiplexed stream for the time frame interval.

DETAILED DESCRIPTION

Figure 1:
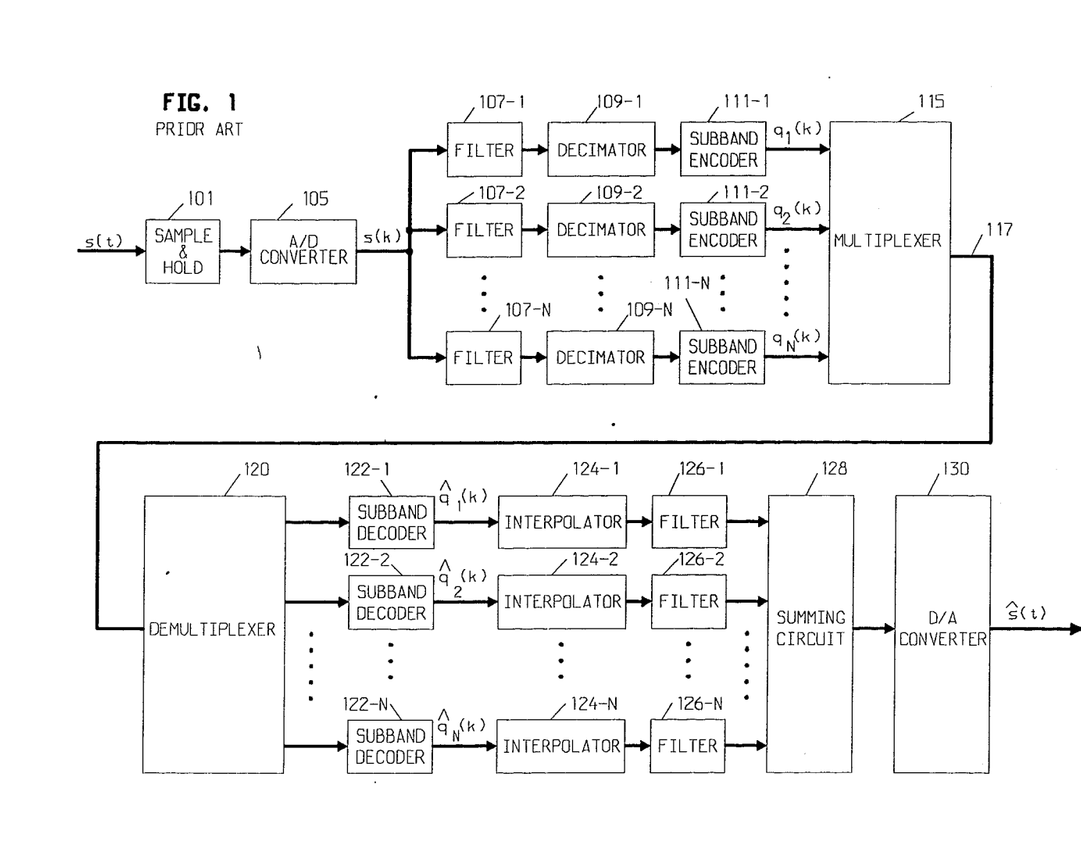
FIG. 1 depicts a sub-band coding arrangement for speech signals illustrative of the prior art.

FIG. 1 shows a sub-band speech coding arrangement according to the prior art which includes a digital encoder for converting a speech signal to a low bit rate digital stream, a digital transmission channel for transporting the digital bit stream, and a remotely located decoder for converting the digital bit stream into a replica of the speech signal. In FIG. 1, a speech signal s(t) is sampled at a predetermined rate, e.g., 8 Khz, in sampler 101 to form a sequence of speech samples s(1), s(2) . . . s(k). Each speech sample is converted into a corresponding digital representation in analog to converter 105. The output of converter 105 is supplied to sub-band filters 107-1, 107-2 . . . 107-N which divide spectrum of the speech samples into prescribed sub-bands. The filters may be digital filters designed to pass prescribed sub-band portions of the signal samples s(k) to decimators 109-1 through 109-N.

As is well known in the art, the sub-band portions obtained from the filters 107-1, 107-2 . . . 107-N have much lower bandwidths than the input speech signal so that the sampling rate of the sub-band portion may be reduced accordingly. The sampling rate reduction is performed in decimators 109-1 through 109-N. Each decimator is adapted to reduce the sampling rate by a predetermined factor, e.g., 8, and the decimated digitized samples therefrom are processed to form reduced bit rate quantized codes $q_1(k)$, $q_2(k)$ . . . $q_N(k)$ in sub-band coders 111-1 through 111-N. The codes $q_1(k)$, $q_2(k)$ . . . $q_N(k)$ are assembled into a bit stream in multiplexer 115 and applied to transmission channel 117.

The bit stream from transmission channel 117 is separated into sub-bands in demultiplexer 120, and the digital codes $\hat{q}_1(k)$, $\hat{q}_2(k)$ . . . $\hat{q}_N(k)$ of the sub-band portions are decoded in sub-band decoders 122-1 through 122-N to form digital representations of the sub-band speech samples. Interpolators 124-1 through 124-N are operative to increase the sampling rates of the digitized sub-band samples by introducing zero value samples between sub-band samples. The interpolated sub-band portion digital sample representations are passed through synthesis filters 126-1 through 126-N and combined in summing circuit 128 to form a replica $\hat{s}(t)$ of the original speech signal. As is well recognized, sub-band coding is a relatively simple arrangement that permits the use of a low bit rate channel for transmission of digital speech.

If the digital transmission channel is subject to noise that creates error bursts, however, a portion of the bits transmitted over the channel must be assigned to error correction and the bits available for speech coding may be insufficient to encode the speech signal. Consequently, it is necessary to divide the sub-band sample stream into time frame intervals and allocate bits to the sub-band coders over the time frame interval. One or more sub-bands may have no bits allocated thereto for a time interval and the pattern of no bits for a particular sub-band may occur irregularly. This irregular bit allocation produces chirp-like artifacts in the speech replicas obtained from the decoding arrangement.

Figure 2:
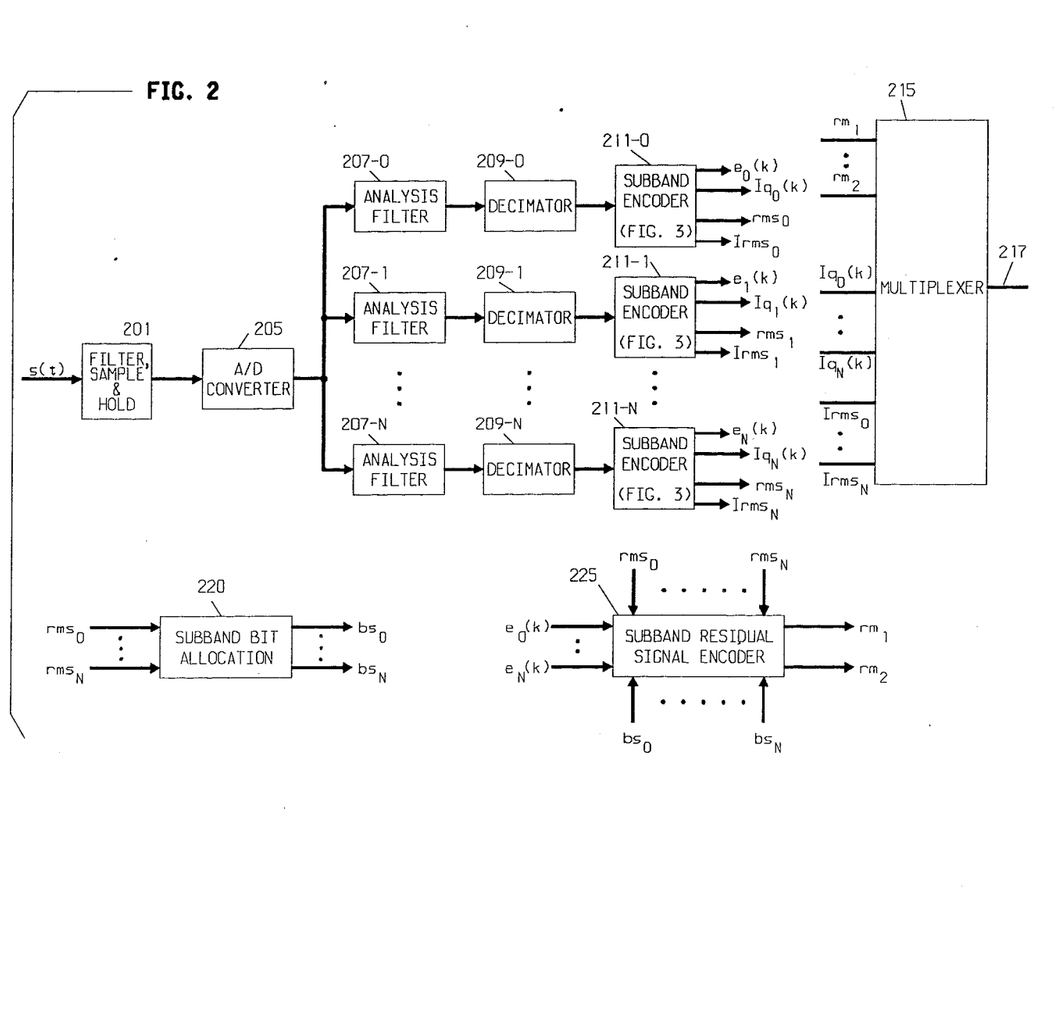
FIG. 2 depicts a block diagram of a sub-band coding arrangement illustrative of the invention.

FIG. 2 depicts a general block diagram of a sub-band coding arrangement illustrative of the invention in which bit allocation is employed to restrict the number of bits for each time frame interval of the input speech and selected sub-band residual coding is employed to substantially reduce the resulting chirp type artifacts. The arrangement of FIG. 2 converts a speech pattern to a sequence of samples at a predetermined rate (8 Khz) and forms a digital representation of each sample. These digitized samples are partitioned into groups of 128 which occur in a time frame interval of 16 ms. The samples are passed through analysis filters to divide the spectrum of each sample into a plurality of sub-band portions. Signals representing the rms energy of the speech patterns of the sub-bands for the time frame interval are produced and used to allocate a number of bits to each sub-band. The successive samples of each sub-band of the time frame interval are normalized to the sub-band rms values and the normalized samples are quantized in accordance with the number of bits allocated to the sub-band. Index signals corresponding to the rms values and the quantized sub-band samples of the time frame interval are assembled for transmission.

In accordance with the invention, the residual quantizing error for each sub-band sample is formed and a vector of the sub-band residual signals is generated. Estimates of the rms values of the residual errors of the sub-bands are produced and the two sub-bands having the largest quantizing errors are selected. The selected sub-band vectors are encoded by matching the vectors to entries of a Gaussian codebook and index signals identifying the codebook entries are added to the assembled index signals for transmission. In this way, the residual signals for the sub-bands having the largest quantizing errors are transmitted so that the chirp-like artifacts are reduced. The transmission rate is minimized by removing the time frame bit allocation from the transmitted bit stream and replacing the selected residual signals with index codes representative thereof. At the decoder end of the transmission channel, the time frame bit allocation signals are reconstructed from the rms value indices, the quantized signal indices are converted into speech samples and the residual signals of the selected sub-bands are reconstructed from a codebook and the rms signals.

Referring to FIG. 2, sampler 201 samples speech signal s(t) at a predetermined rate, e.g., 8 Khz, and analog to digital converter 205 transforms each sample into a digital representation thereof. The stream of digitized samples is partitioned into successive time frame intervals, e.g., 16 ms duration, and applied to analysis filters 207-0 through 207-N. Each analysis filter is a digital filter operative to pass a prescribed sub-band portion, e.g., 500 Khz, of the spectrum of the digitized sample stream to a decimator arranged to reduce the sampling rate of the sub-band portion signal from 8 Khz to 1 Khz. Analysis filter 207-0, for example, is a digital filter of the type well known in the art arranged to have an impulse response $$h_n(p) = 2h(p)\sin\left[\frac{\pi}{16}(i+\tfrac{1}{2})\left(p - \frac{63}{2}\right) + O(i)\right] \quad (1)$$

where $$0 \leq p \leq 63$$

$$O(i) =$$

$$\begin{cases} -3\pi/4 \ n \text{ odd} \\ -\pi/4 \ n \text{ even} \end{cases} \text{ so that the output of the filter provides a signal}$$

$$S_n(k) = \sum_{p=0}^{63} s(k-p)h_n(p) \quad (2)$$

corresponding to the selected sub-band portion of the speech sample s(k).

The output of analysis filter 207-0 occurs at the same sampling rate as full bandwidth speech samples from analog to digital converter 205. Decimator 209-0 reduces the sampling rate by passing every eighth sample from filter 207-0 to sub-band coder 211-0 by means well known in the art. Sub-band coders 211-0 through 211-N are adapted to generate quantized values $q_0(k)$, $q_1(k)$ . . . $q_N(k)$, k=0,1 . . . 15 corresponding to the sub-band portion speech signals and index signals $I_{q0}(k)$, $I_{q1}(k)$ . . . $I_{qN}(k)$ representing the quantized values. These index signals are combined in bit multiplexer 215 for transmission. In order to allocate bits to sub-band coders 211-0 through 211-N, the rms speech energy of the time frame interval in each sub-band is first determined in its sub-band coder. The rms signals from sub-band coders 211-0 through 211-N are applied to sub-band bit allocator 220 wherein the number of bits for each sub-band sample in the present time frame is selected. The signals $bs_0$ through $bs_n$ are applied to sub-band coders 211-0 through 211-N, respectively, to control the number of bits produced for each sample of the time frame interval. The sequence of samples for the time frame interval are delayed until the formation of the rms and bit allocation signals is completed.

Figure 3:
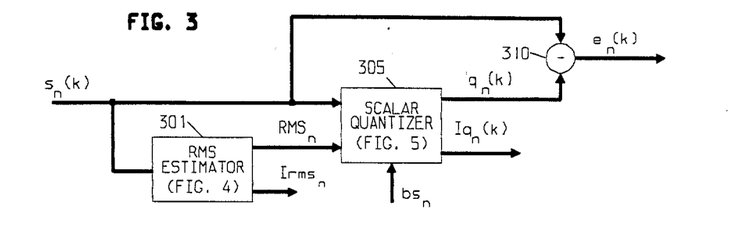
FIG. 3 shows a block diagram of one of the sub-band coders of FIG. 2.

The sub-band coder circuit is shown in greater detail in the block diagram of FIG. 3. In FIG. 3, rms estimator 301 is adapted to form a signal $rms_n$ representative of the speech energy of sub-band speech samples $s_n(k)$ of the present time frame and an index signal $Irms_n$ corresponding thereto. Scalar quantizer 305 quantizes the 16 digitized sub-band samples $s_n(k)$ of the time frame interval to produce 16 quantized signals $q_n(k)$ and 16 index signals $I_{qn}(k)$ corresponding thereto for each sub-band in the time frame responsive to the speech energy signals $rms_n$ and the bit allocation signals $bs_n$ derived therefrom. Subtracter 310 produces the difference signal $$e_n(k) = s_n(k) - q_n(k) \quad (3)$$

for $0 \leq = k \leq = 15$ representing the residual error in quantization for sub-band n. For each time frame interval, the index signal outputs $I_{q0}(k)$, $I_{q1}(k)$ . . . $I_{qN}(k)$, and the rms index signal outputs of the time frame $Irms_0$, $Irms_1$, . . . $Irms_N$ from sub-band coders 211-0 through 211-N in FIG. 2 are applied to bit multiplexer 215. The signals $I_{q0}(k)$, $I_{q1}(k)$ . . . $I_{qN}(k)$, k=0,1,2,3 . . . K, represent the quantized values of the time frame, and the signals $Irms_0$, $Irms_1$, . . . $Irms_N$ represent the rms values of the time frame necessary to reconstruct the sub-band portion codes.

Figure 4:
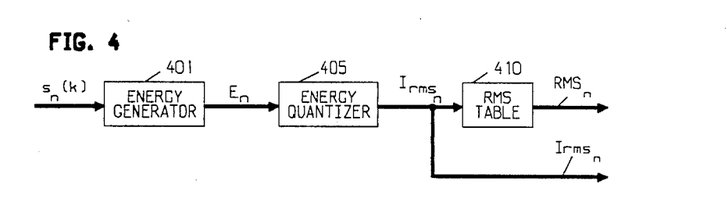
FIG. 4 shows a more detailed block diagram of the RMS estimator circuit of FIG. 3.

RMS estimator 301 of FIG. 3 is shown in greater detail in FIG. 4. With reference to FIG. 4, the sub-band portion signals $s_n(k)$ are applied to energy signal generator 401 wherein the signal $$E_n = B\left[\sum_{k=0}^{k} s_n^2(k)\right] \quad (4)$$

corresponding to the speech energy of sub-band n of the time frame interval is formed. Sub-band energy signal $E_n$ is quantized to one of a set of standard values in energy quantizer 405 which generates an index value signal $Irms_n$ corresponding to the time frame speech energy at its output. The index value $Irms_n$ is converted to an rms value in ROM-type RMS table 410 to provide a signal $rms_n$ corresponding to the rms value of the energy. The $rms_n$ signal is applied to bit allocator 220 in FIG. 2, and the $Irms_n$ index signal is applied to bit multiplexer 215. The $rms_n$ signals remain fixed for the entire time frame and constitute the side information of the time frame interval from which the coded signals of the time frame interval may be decoded.

Figure 6:
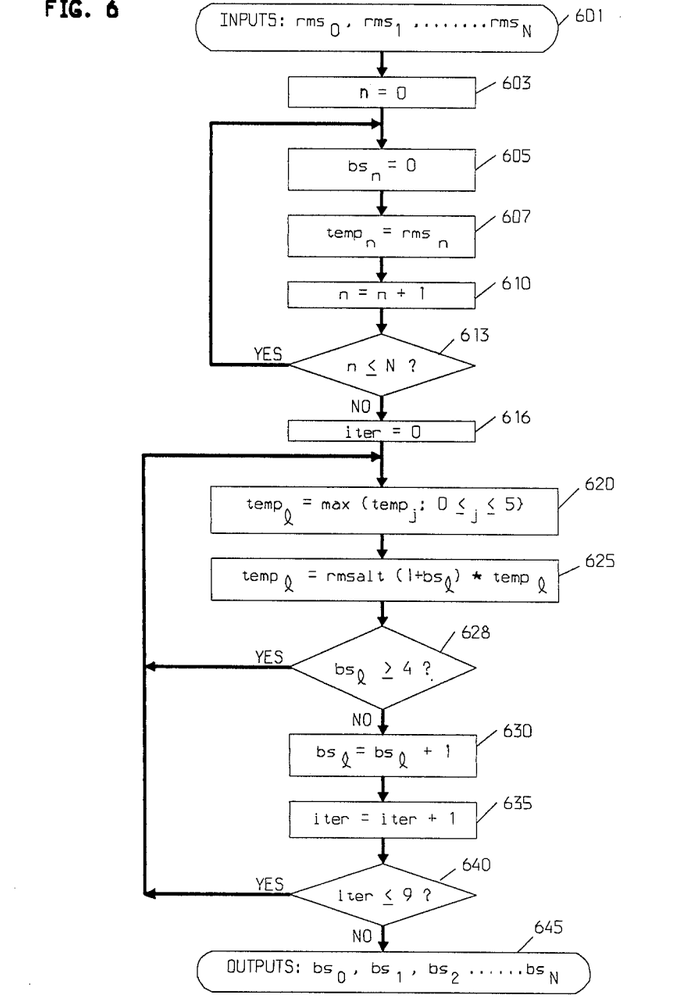
FIG. 6 shows a flow chart illustrating the operation of the bit allocator in FIG. 2.

Sub-band bit allocator 220 may comprise a microprocessor device including a read only type memory incorporating a set of instruction codes for performing the operations shown in the flow chart of FIG. 6. In FIG. 6, the $rms_0$ through $rms_N$ signals developed in the rms signal generator of FIG. 4 are applied to the inputs of bit allocator 220 as in step 601 of FIG. 6. The sub-band coder index n is reset to zero in step 603, and the loop from step 605 to decision step 613 is entered. For each sub-band index n, this loop is operative to set the bit signal $bs_n$ to zero (step 605), store the $rms_n$ value for the sub-band as signal $temp_n$ (step 607) and increment index signal n (step 610). After the signals for the last index N are processed, step 616 is entered from decision step 613 wherein bit iteration index signal iter which controls the number of iterations in the bit allocation processing is set to zero.

The loop from step 620 to step 640 functions to produce bit allocation signals $bs_n$ which control the number of bits formed in each sub-band coder for each sample in the time frame. For a 12 Kbps coder, the total number of bits from all sub-band coders for each sample may be selected as 9 while the maximum number of bits for any sample of a sub-band may be 4. When the bit allocation loop is entered, the maximum stored rms value is selected in step 620 as rms value $temp_l$, and this value is modified by a factor $rmsatt(1+bs_l)$ in step 625. The attenuation factor is a function of the number of bits already selected for the sub-band l. If the number of bits signal $bs_l$ is less than 4, it is incremented in step 630 and the iter index signal is incremented in step 635. When index signal iter is less than the total number of bits for the sample position (step 640), step 620 is reentered for another bit allocation iteration. After the sum of the allocated bits totals 9, the number of bit signals $bs_0$, $bs_1$ . . . $bs_N$ are applied to the sub-band coders to control the scalar quantizers therein (step 645). The signals $bs_0$ through $bs_N$ remain constant for the duration of the time frame interval so that each of the samples for the sub-band n is quantized to $bs_n$ bits.

Figure 5:
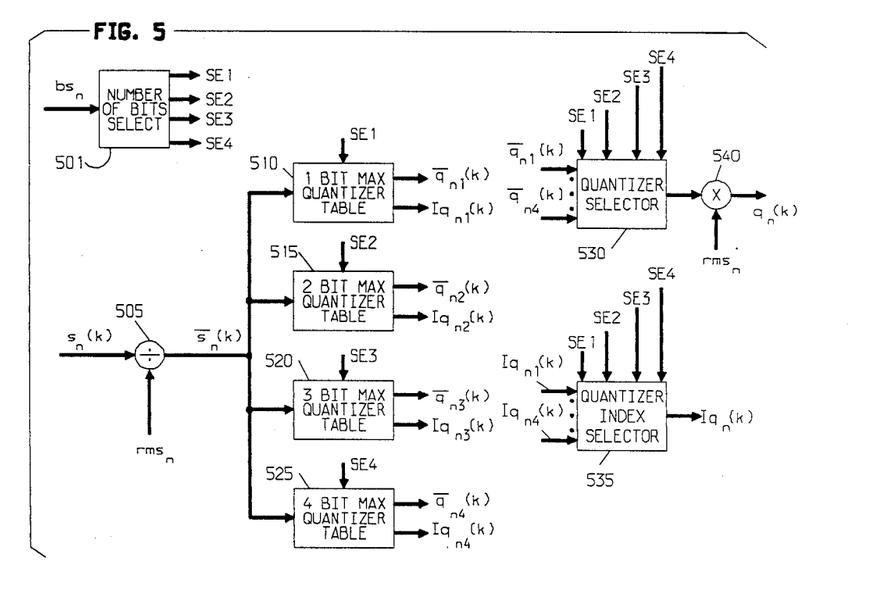
FIG. 5 shows a more detailed block diagram of the scalar quantizer circuit of FIG. 3.

The scalar quantizer of FIG. 3 shown in greater detail in FIG. 5 includes number of bits selector 501, divider 505, quantizer table units 510, 515, 520 and 525, quantizer selector 530 and quantizer index selector 535. As aforementioned, each sub-band is allocated a predetermined number of bits for the quantization of each sample of the time frame interval so that the quantizer adapts to the bit allocation signal. The time frame interval sample signals which are input to quantizer table units are delayed until the bit allocation and rms speech energy signals for the time frame are generated. Quantizer 510 is adapted to generate a 1-bit maximum quantized value and an index signal corresponding thereto for each rms normalized sub-band sample $\bar{s}_n(k)$ from divider 505. Quantizer 515 generates a 2-bit maximum quantized value and corresponding index signal responsive to normalized signal $\bar{s}_n(k)$. Quantizer 520 produces a 3-bit maximum signal and corresponding index signal for normalized signal $\bar{s}_n(k)$, and quantizer 525 forms a 4-bit maximum quantized value and corresponding index signal for normalized signal $\bar{s}_n(k)$.

Selector 501 in the quantizer for sub-band coder n receives the number of bits signal $bs_n$ assigned to sub-band n and produces a set of select signals SE1, SE2, SE3 and SE4. Signal SE1 corresponds to bit allocation signal $bs_n=1$, signals SE2, SE3 and SE4 correspond to bit allocation signals $bs_n=2$, $bs_n=3$ and $bs_n=4$, respectively. Only one of the select signals is activated if the sub-band samples are quantized for the time frame interval. The select signals are supplied to the enable inputs of quantizer tables 510, 515, 520 and 525 so that only one quantizer table is enabled. If $bs_n=1$, quantizer table 510 is activated, and one bit quantized value $q_{n1}(k)$ and index signal $Iq_{n1}(k)$ is generated responsive to rms normalized sample signal $\bar{s}_n(k)$. Similarly, a $bs_n=2$ signal activates quantizer table 515 to produce a 2-bit quantized value code $q_{n2}(k)$ and index code $q_{n2}(k)$; a $bs_n=3$ signal causes table 520 to generate a 3-bit code $q_{n3}(k)$ and index code $Iq_{n3}(k)$ and a $bs_n=4$ signal results in a 4-bit quantized value $q_{n4}(k)$ and index signal $Iq_{n4}(k)$ from quantizer table 525. The quantized value from the enabled quantizer table is sent to quantizer selector 530 while the index signal corresponding thereto is sent to quantizer index selector 535. Selector signals SE1, SE2, SE3 and SE4 address selectors 530 and 535 to cause the quantized value from the enabled quantizer table to appear at the output of selector 530 and the corresponding index signal to appear at the output of selector 535. The output of selector 530 is scaled by the sub-band rms signal in multiplier 540 to restore the quantized value.

For each sub-band sample in a time frame interval, a residual signal $e_n(k)$ is produced according to equation 3. As a result, each sub-band coder n produces a sequence of 16 residual signals $$e_n(0), e_n(1) \ldots e_n(15) \qquad (5)$$

These residual signals are combined to form a 16 element vector. The residual signals are obtained from the digitized samples $s_n(k)$ are uncoded digital representations so that the number of bits in each residual signal of the time frame interval and the resulting residual vector may be high. In accordance with the invention, the circuit of FIG. 2 is adapted to select the residual vectors of two sub-band coders, vector quantize the selected residual vectors to a random number codebook, and apply index signals corresponding to the selected codebook entries to bit stream multiplexer 215. The sub-bands with the largest residual errors are selected for residual signal encoding. In this way, the residual vectors which have the largest rms values are compressed into a pair of low bit index codes and the quality of the reconstructed speech signal is improved.

Figure 7:
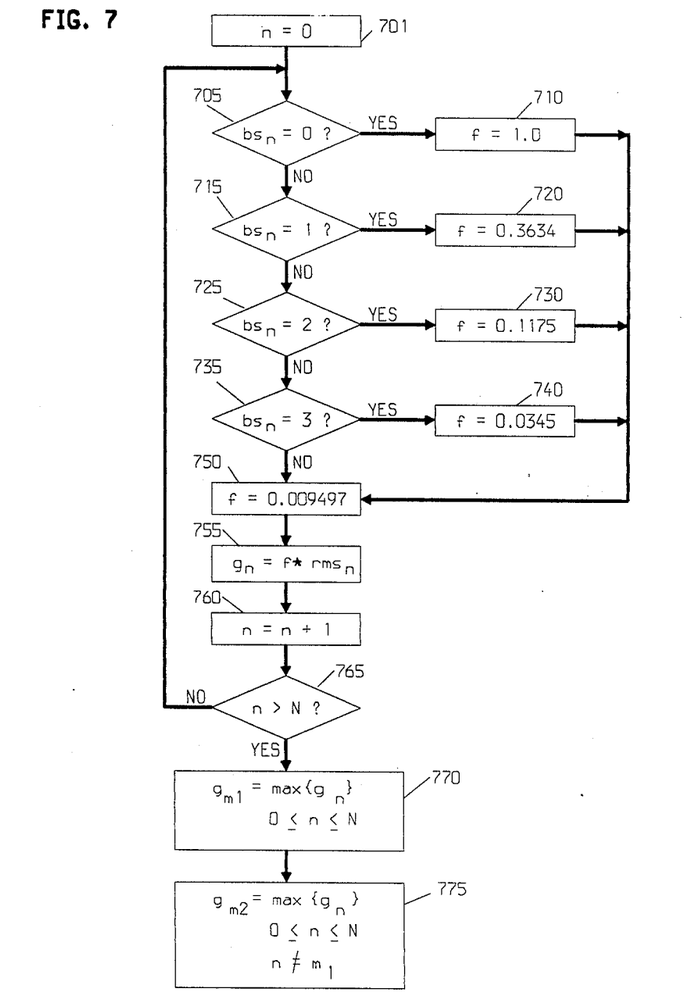
FIGS. 7 and 8 show flow charts illustrating the operation of the residual signal coder of FIG. 2.

The quantization of the residual signals is performed in sub-band residual quantizer 225 in FIG. 2. Quantizer 225 may comprise a digital processor of a type well known in the art and controlled by a set of instruction codes stored in read only memory to perform the operations shown in the flow charts of FIGS. 7 and 8. In order to quantize the sub-band residual signal vector of expression 5, a signal $g_n$ representative of an rms estimate of the residual vector $e_n$ is obtained and the two largest rms estimate signals are chosen as illustrated in the flow chart of FIG. 7. With reference to FIG. 7, sub-band index signal n is reset to zero in step 701, the bit allocation signal $bs_n$ for the current sub-band n is evaluated in decision steps 705, 715, 725 and 735, and an rms adjustment factor f is set in one of steps 710, 720, 730, 740 or 750. The particular values for the rms adjustment factor f are selected according to the teaching of the article "Quantizing for Minimum Distortion" by Joel Max appearing in the *IRE Transactions on Information Theory*, Vol. IT-6, pp. 7–12, Mar. 1960. For a zero bit allocation signal (step 705), rms adjustment factor f is set to 1.0 in step 710. If the allocation bit signal is 1 (step 715), rms adjustment factor f is set to 0.3634 in step 720, while an allocation bit signal of 2 (step 725) produces an rms adjustment factor f of 0.1175 in step 720. An allocation bit signal of 3 (step 735) results in an rms adjustment factor of 0.03454 in step 740, and a bit allocation signal of 4 from step 735 causes the rms adjustment factor to be set to 0.009497 in step 750.

After the rms adjustment factor is set, the rms estimate signal is generated in step 755 by forming the rms estimate signal $$g_n = (f)(rms_n) \qquad (6)$$

Sub-band index signal n is then incremented in step 760, and the next iteration is entered via step 705 from decision step 765. After the last sub-band rms estimate signal $g_n$ is formed, the maximum sub-band rms estimate signal is identified in step 770, and the next maximum rms estimate signal is identified in step 775. These selected estimate signals correspond to the two sub-bands with the maximum quantization errors. The 16 component residual signal vector for each of these sub-bands is coded by matching the residual vector signal of the selected sub-band to an entry in a 256*16 codebook populated with independent random Gaussian numbers having zero means and unit variances scaled by the sub-band rms estimate signal $g_n$ of the residual differences. Each codebook entry is indexed and has the form $$C_r(0), C_r(1) \ldots C_r(15) \text{ for } 0 \leq r \leq 255 \qquad (7)$$

Once the codebook entries are selected, index signals for the entries are applied to bit stream multiplexer 215.

Figure 8:
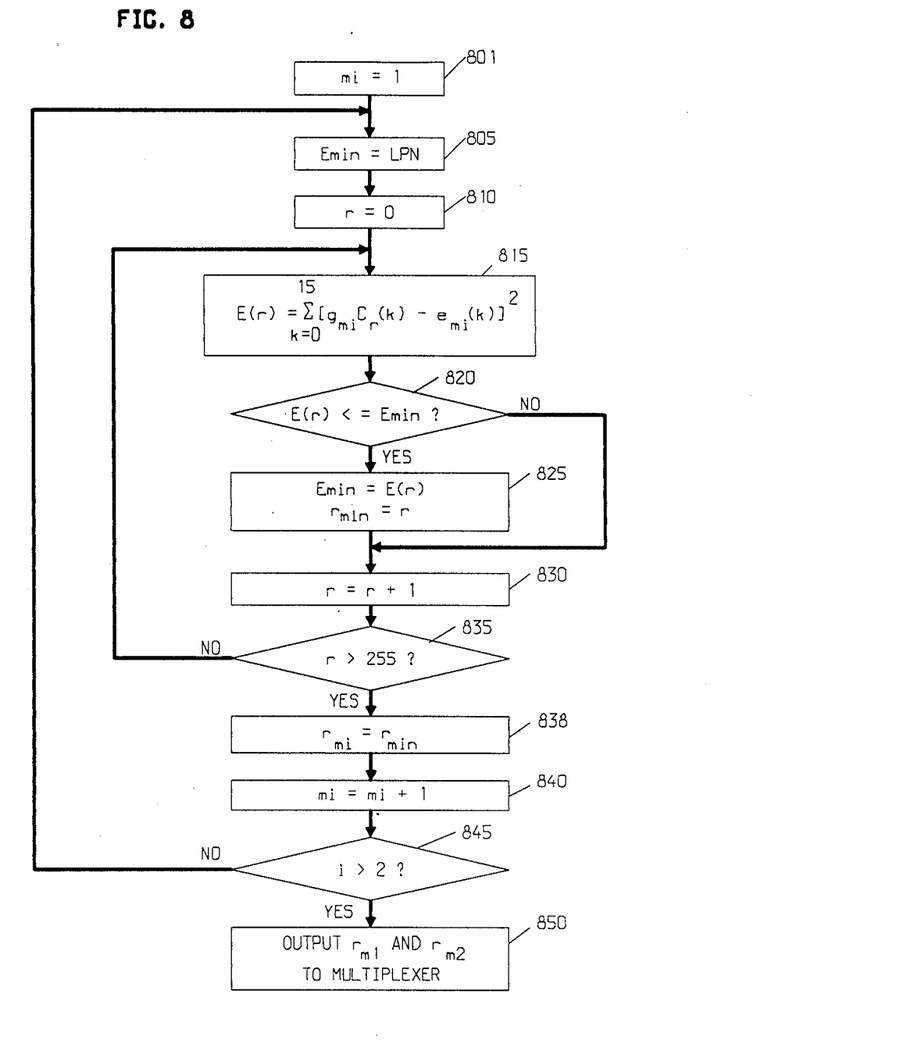

The process of matching the codebook entries to the sub-band residual signal vector is illustrated in the flow chart of FIG. 8. Initially, sub-band index mi is set to m1 in step 801, signal $E_{min}$ is set to the largest possible number (LPN) used, and codebook index signal r is set to zero in step 810. Step 815 is then entered to obtain a signal E(r) which measures the difference between the normalized codebook entry $g_{mi}C_r(k)$ and the sub-band residual vector $e_{mi}(k)$. If the difference measure signal E(r) is less than $E_{min}$ (step 820), $E_{min}$ is set to E(r) and $r_{min}$ is set to r in step 825, and codebook index incrementing step 830 is entered. Otherwise, $E_{min}$ and $r_{min}$ remain unaltered and step 830 is entered directly from decision step 820. Codebook entry index r is incremented in step 830, and step 805 is reentered via step 835 to compare the next codebook entry to the sub-band residual vector. After the last codebook entry is processed, $r_{mi}$ is set to $r_{min}$ in step 838. The selected sub-band index mi is then incremented in step 840 so that the iterative process is repeated to determine the closest matching codebook entry to the residual signal vector for the other selected sub-band. The codebook index signals for the two selected sub-bands, $r_{m1}$ and $r_{m2}$ are then applied to bit stream multiplexer 215 in FIG. 2 (step 850).

For each successive time frame interval of K samples, e.g., 16, the stream multiplexer receives the sequence of quantized sub-band index signals $Iq_0(k), Iq_1(k) \ldots Iq_N(k)$ from sub-band coders 211-0 through 211-N, the rms value index signals $Irms_0, Irms_1 \ldots Irms_N$ and the residual vector indices $r_{m1}$ and $r_{m2}$. The multiplexer combines the index signals into a block representative of the time frame speech pattern and applies the index signal block to transmission channel 217. Error correction codes may be added to the signal block as is well known in the art if a mobile telephone channel subject to burst type errors, fading and noise is used. The bit rate is minimized by transmitting only the index signals of the time frame interval.

Figure 9:
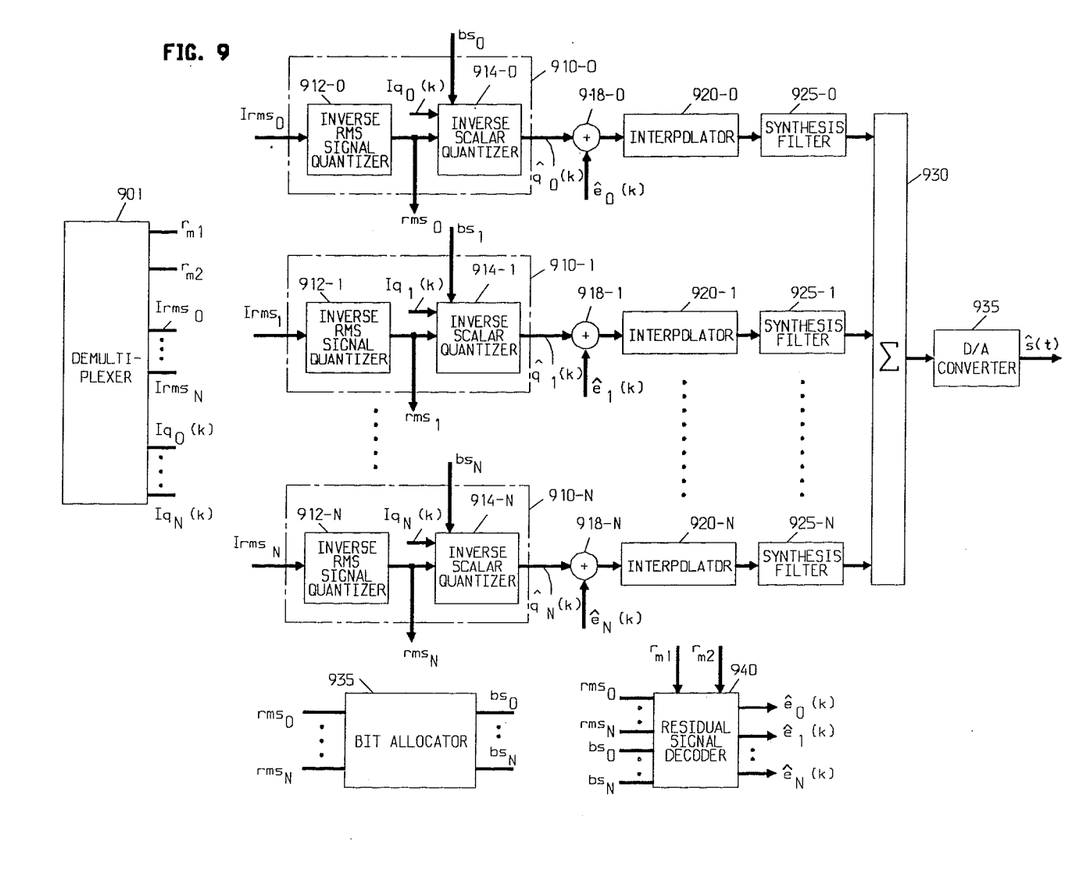
FIG. 9 depicts a general block diagram of a sub-band decoding arrangement illustrative of the invention.

The decoding arrangement shown in FIG. 9 is adapted to form a replica $\hat{s}(t)$ of the time interval speech pattern from the index signal block of the time frame interval. This is accomplished through use of the $rms_n$ signal side information of the time frame interval. The $rms_n$ signals are produced by table look up from the transmitted rms index signals and the bit allocation signals are generated by the same process used in the coding arrangement of FIG. 2. The quantized sample index signals may then be reconstructed using inverse quantization tables for each sequence of sub-band quantized index signals.

In accordance with the invention, the rms signals of the sub-band are combined with the bit allocation signals to form rms estimate signals for the sub-band residual differences and to determine which residual signal vectors are to be reconstructed for the time interval. The codebook entries for the selected sub-bands are combined with the reconstructed rms estimate signals to form the residual signal sequence for the selected sub-band and the reconstructed quantized samples are combined with the reconstructed residual signals to form a replica of the sub-band speech signals $\hat{s}_n(k)$. Once signals $\hat{s}_n(k)$ have been formed, the sampling rate is increased to twice the bandwidth of the full speech signal by interpolation, the interpolated sub-band speech signals are filtered to remove non-sub-band components therefrom and the resulting signals are combined to reconstruct the original speech signal.

Referring to FIG. 9, the bit stream for the present time frame interval is separated into the set of rms index signals $Irms_0, Irms_1 \ldots Irms_N$, the set of quantized sub-band index signals $Iq_0(k), Iq_1(k) \ldots Iq_N(k)$ and residual vector indices $r_{m1}$ and $r_{m2}$ by demultiplexer 901. Each sub-band decoder, e.g., 910-n, receives an rms index signal $Irms_n$ and the sequence of quantized sub-band index signals $Iq_n(k), k=0,1, \ldots, K=15$ for the sub-band and is operative to produce a quantized sample $\hat{q}_n(k)$ for each quantized sub-band index code $Iq_n(k)$ applied thereto. The rms index signal is applied to inverse rms quantizer 912-n of sub-band decoder 910-n which converts the index signal to a signal $rms_n$ representative of the rms speech energy of the sub-band. The rms signals from all the sub-bands are supplied to bit allocator 935 which operates in the same manner as described with respect to bit allocator 220 in FIG. 2 to output the bit allocation signals $bs_0, bs_1 \ldots bs_N$ of the time frame interval to inverse scalar quantizers 914-0 through 914-N. The bit allocation signal $bs_n$ for each sub-band is combined with the sub-band rms signal $rms_n$ and the successive quantized index signals of the sub-band $Iq_n(0), Iq_n(1) \ldots Iq_n(K)$ to produce the sequence of quantized sample replicas $\hat{q}_n(0), \hat{q}_n(1) \ldots \hat{q}_n(K)$ for the sub-band.

The residual signals of the sub-bands are produced in residual signal decoder 940. Decoder 940 includes a codebook identical to the codebook in the sub-band coding circuit of FIG. 2 so that the individual sub-band residual signals $\hat{e}_n(0), \hat{e}_n(1) \ldots \hat{e}_n(K)$ of the sub-bands can be reconstructed responsive to the rms signals, the bit allocation signals and the residual signal vector indices. The sub-band quantized signals $\hat{q}_n(0), \hat{q}_n(1) \ldots \hat{q}_n(K)$ are combined with the residual quantized signals $\hat{e}_n(0), \hat{e}_n(1) \ldots \hat{e}_n(K)$ in adder 918-n to form a replica of the sub-band portion signal $$\hat{S}_n(k) = \hat{q}_n(k) + \hat{e}_n(k) \qquad (8)$$

The sampling rate of the reconstructed sub-band portion sample signals from adders 918-0 through 918-N is increased from twice the sub-band bandwidth to twice the bandwidth of the total signal in interpolators 920-0 through 920-N. Each interpolator operates to insert a series of zero valued samples between successive sub-band samples as is well known in the art so as to provide full speech bandwidth sampling in accordance with $$\hat{s}_n(k) = \sum_{p=0}^{63} s_n(k-p) f_n(p) \quad 0 \le n \le N$$

where $$f_n(p) = 16h(p) \sin\left[ -\frac{\pi}{16} \left( n + \frac{1}{2} \right) \left( \frac{63}{2} - p \right) + O_{(n)} \right]$$

$$0 <= p <= 63$$

$$O_n = \begin{cases} -\pi/4 & n \text{ even} \\ -3\pi/4 & n \text{ odd} \end{cases} \qquad (9)$$

The interpolator outputs are band limited in synthesis filters 925-0 through 925-N and the sub-band portion signals from the synthesis filters are summed in summing circuit 930. The summed samples are converted into an analog signal in digital to analog converter 935 to form a replica $\hat{s}(t)$ of the speech signal applied to the input of the coder of FIG. 2.

Figure 10:
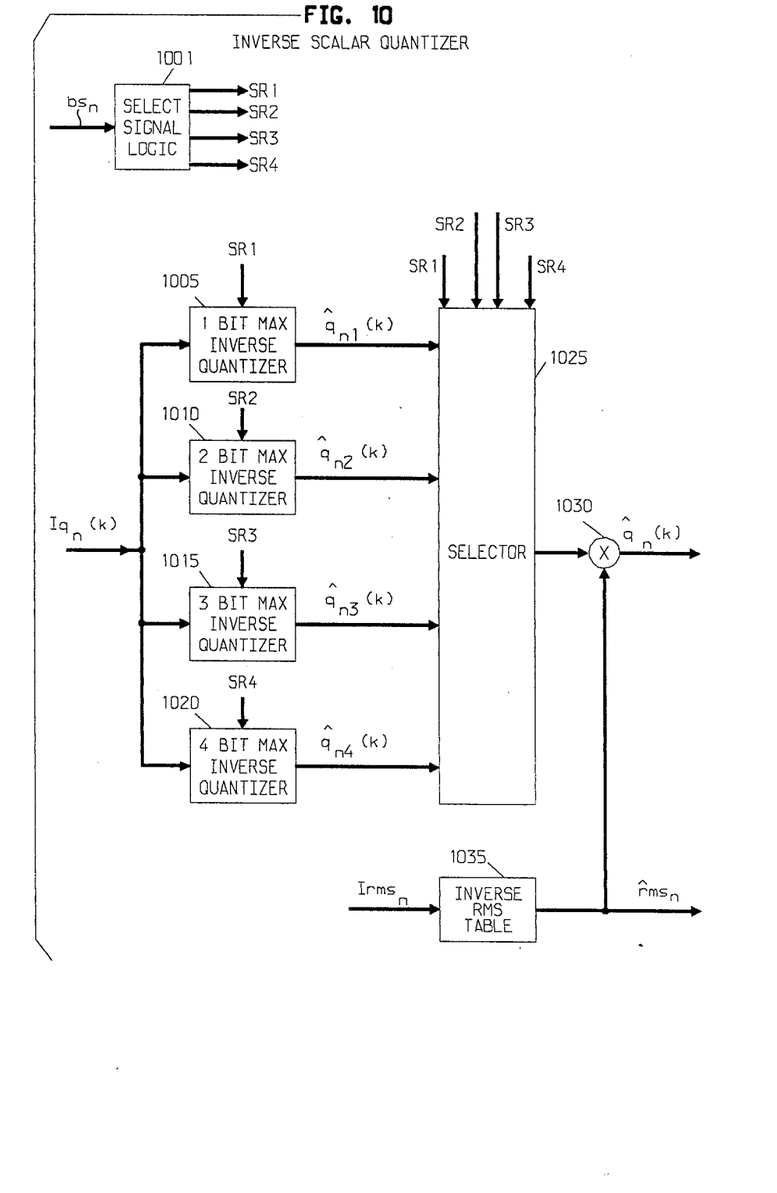
FIG. 10 shows a more detailed block diagram of one of the sub-band decoders of FIG. 9.

FIG. 10 shows inverse scalar quantizer 914-n of sub-band decoder 910-n in greater detail. The inverse quantizer arrangement is operative after the formation of the rms and bit allocation signals of the sub-bands. In FIG. 10, selector signal logic 1001 generates selection control signals SR1, SR2, SR3 and SR4 corresponding to the sub-band bit allocation signal $bs_n$ for the time frame interval. Only one selection control signal is rendered enabling. The successive sub-band quantized index signals $Iq_n(0), Iq_n(1) \ldots Iq_n(K)$ are applied to the inputs of 1-bit max inverse quantizer 1005, 2-bit max inverse quantizer 1010, 3-bit max inverse quantizer 1015 and 4-bit inverse quantizer 1020. Each inverse quantizer is a table in read-only type memory which is enabled for the duration of the time frame interval by one of the selection control signals and addressed by each successive quantized index signal $I\hat{q}_n(k)$ to produce the corresponding rms normalized sub-band quantized sample value $\hat{q}_n(k)$. If one bit is assigned to the sub-band in the present time interval, signal SR1 enables 1-bit maximum inverse quantizer table 1005, and the appropriate quantized sample value is applied to selector 1025. In similar fashion, inverse quantizer 1010 is enabled by selection control signal SR2 when two bits have been allocated to the sub-band. Inverse quantizer 1015 is enabled by selection control signal SR3 when 3 bits have been allocated to the sub-band, and inverse quantizer 1030 is enabled by selection control signal SR4 when 4 bits have been allocated to the sub-band.

Selector 1025 is addressed by control signals SR1, SR2, SR3 and SR4 to permit passage therethrough of the quantized sample values from the enabled inverse quantizer. Inverse rms table 1035 converts the rms index signal of the sub-band for the present time frame interval into a signal representative of the time frame rms speech energy. Table 1035 comprises a read-only memory addressed by the $Irms_n$ signals to produce corresponding $rms_n$ signals. The product of the $rms_n$ signal from ROM 1035, and the signal from selector 1025 is formed in multiplier 1030 which supplies the sub-band sample value sequence $\hat{q}_n(0), \hat{q}_n(1) \ldots \hat{q}_n(K)$ for the time frame interval to one input of adder 918-n in FIG. 9.

The other input to adder 918-n is the sequence of sub-band residual signals $\hat{e}_n(k)$ obtained from residual signal decoder 940. This decoder comprises a microprocessor device such as the Intel type 8080 having a set of instructions permanently stored therein to provide the sub-band residual signals $\hat{e}_n(k)$ responsive to the residual signal vector index signals $r_{m1}$ and $r_{m2}$ for each successive time frame interval. The microprocessor also has stored therein an indexed 256 entry Gaussian codebook having 16 element entries identical to the one described with respect to the circuit of FIG. 2.

Figure 11:
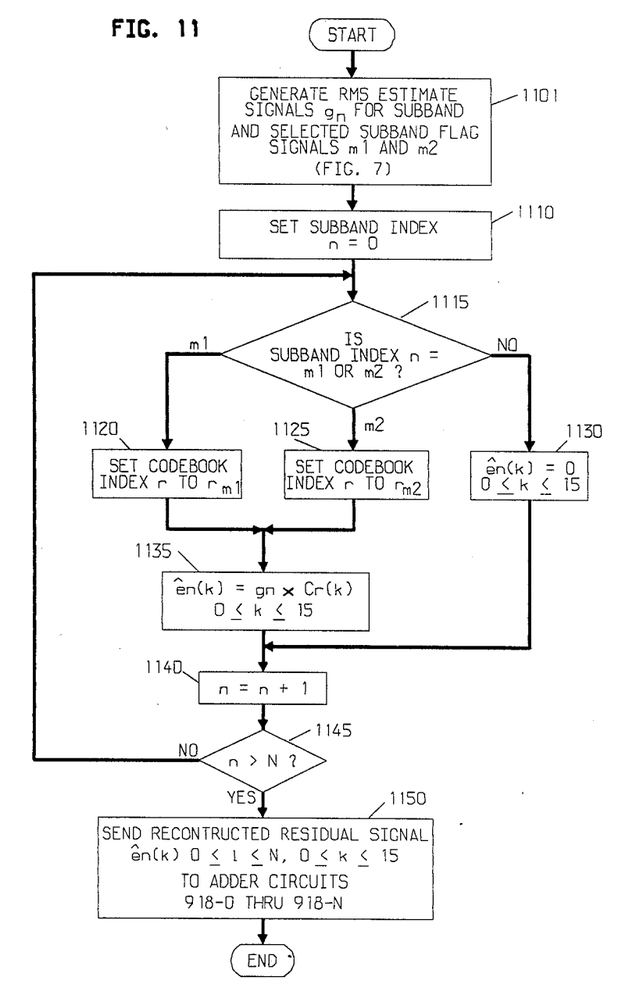
FIG. 11 shows a flow chart illustrating the operation of the inverse residual signal decoder of FIG. 9.

FIG. 11 is a flow chart showing the operation of residual signal quantizer 940 in accordance with the stored instructions. Referring to FIG. 11, the rms estimate signals for the sub-bands are reconstructed in the residual signal quantizer from the sub-band bit allocation and the rms signals of the time frame interval in step 1101. The reconstruction of the rms estimate signals $g_n$ is performed in the same manner as described with respect to FIG. 7 for the coding arrangement of FIG. 2. Sub-band index signal n is set to zero (step 1110).

The generation of the residual signals for the sub-band is then started by setting the sub-band index signal n to zero (step 1110) and entering the residual signal generating loop from step 1115 to step 1145. For each sub-band, the sub-band codebook flag is checked in decision step 1115 to determine whether it is $m_1$ or $m_2$ indicating a selected sub-band. If it is other than $m_1$ or $m_2$, the reconstructed residual signals for the sub-band are set to zero in step 1130. If the sub-band codebook flag is $m_1$ or $m_2$, the codebook index from the demultiplexer is set $r_{m1}$ or $r_{m2}$ in step 1120 or 1125 and the residual signals for the sub-band are formed by combining the rms residual estimate signal for the sub-band with the selected sub-band codebook entry $r_{m1}$ or $r_{m2}$ in step 1135. Sub-band index signal n is then incremented in step 1140 and the loop is iterated for the next sub-band by reentering step 1115. Upon completion of the residual signal reconstruction for the last sub-band n, the reconstructed residual signals for all sub-bands $\hat{e}_n(k)$ are sent to the sub-band adder circuits 218-O through 218-N (step 1150).

The invention has been described with reference to illustrative embodiments thereof. It is apparent, however, to one skilled in the art that various modifications and changes may be made without departing from the spirt and scope of the invention.

I claim:

1. An arrangement for coding speech comprising:
   means for receiving a speech pattern;
   means connected to the speech pattern receiving means for sampling the received speech pattern at a predetermined rate corresponding to the speech pattern bandwidth;
   neans having an input connected to the speech pattern sampling means and a plurality of outputs for dividing the spectrum of the speech pattern samples into a plurality of sub-band portions;
   means connected to each spectrum dividing means output for reducing the sampling rate of the sub-band speech samples therefrom to a lower sampling rate then the predetermined rate;
   means connected to each reducing means ouptput for grouping the sub-band speech samples from the spectrum dividing means into successive time frame intervals of K+1 speech samples;
   means connected to the grouping means responsive to the K+1 sub-band speech samples of the present time frame interval for generating a signal representative of the energy of the sub-band speech of the time frame interval in each sub-band;
   means responsive to the speech energy signals of a plurality of the sub-band portions for generating a set of signals allocating a predetermined number of bits to each sub-band portion;
   means for coding each sub-band speech portion of the present time frame interval including means jointly responsive to the speech energy signal and the bit allocation signal of the sub-band portion for quantizing the sequence of K+1 speech samples of the sub-band;
   means for generating a sequence of signals representative of the residual differences between the sub-band speech samples of the time frame interval and the corresponding quantized sub-band speech samples;
   means connected to the speech energy signal generating means, the bit allocation generating means and the residual difference signal generating means responsive to the energy representive signals and the bit allocation signals of a plurality of the sub-bands for selecting at least one of the plurality of sub-bands for encoding the time frame interval residual difference signal sequence;
   means connected to the sub-band selecting means for generating a coded signal representative of the sequence of residual difference signals of the at least one selected sub-band of the time frame interval: and
   means for multiplexing the quantized speech samples, the energy signals of the sub-band portions and coded signal representing the residual difference of the at least one selected sub-band portion to form a coded signal representative of the speech pattern of the time frame interval.

2. An arrangement for coding speech according to claim 1 wherein said means for generating the coded signal representative of the residual difference signals of the at least one selected sub-band of the present time frame interval comprises:

means for storing a plurality of fixed codes each having K+1 elements;

means responsive to the sequence of residual different signals of the selected sub-band for forming a vector signal having k+1 elements, each element corresponding to one of the residual difference signals of the selected sub-band portion;

means for identifying the stored fixed code most closely matching the selected sub-band vector signal; and means for applying a coded signal corresponding to the identified fixed code to the multiplexing means.

3. An arrangement for coding speech according to claim 2 wherein each component of the stored fixed code is a Gaussian code having zero mean and unity variance.

4. An arrangement for coding speech according to claim 2 wherein the means for selecting at least one sub-band for enncoding the residual difference signals comprises:

means responsive to the bit allocation signal and the speech energy signal of each sub-band for generating a signal representative of an estimate of the residual difference of the sub-band; and means responsive to the residual difference estimate signals of the time frame interval for selecting at least the sub-band having the maximum residual difference estimate signal.

5. An arrangement for coding speech according to claim 4 wherein the means for identifying the stored fixed code closely matching the selected sub-band vector signal comprises:

means for comparing the K+1 element residual difference vector signal of the at least one selected sub-band to each stored K+1 element fixed code representing individual residual difference estimate signals of the selected sub-band; and means responsive to the output of the comparing means for selecting the stored fixed code with the minimum difference between the element fixed code and the residual difference vector signal of the selected sub-band; and means responsive to the fixed code selecting means for generating an index code identifying the selected fixed code.

6. A method of coding speech comprising:

receiving a speech pattern;

sampling the received speech pattern at a predetermined rate corresponding the speech pattern bandwidth;

dividing the spectrum of the speech pattern samples into a plurality of sub-band portions;

reducing the sampling rate of the sub-band speech samples to a sampling rate lower than the predetermined rate;

grouping the sub-band speech samples from the reducing means into successive time frame intervals of K+1 speech samples;

generating a signal representative of the energy of the sub-band speech of the time frame interval in each sub-band responsive of the K+1 sub-band speech samples of the present time frame interval;

generating a set of signals allocating a predetermined number of bits to each sub-band portion means responsive to the speech energy signals of a plurality of the sub-band portions;

coding each sub-band speech portion of the present time frame interval including quantizing the sequence of K+1 speech samples of the sub-band jointly responsive to the speech energy signal and the bit allocation signal of the sub-band portion;

generating a sequence of signals representative of the residual differences between the sub-band speech samples of the time frame interval and the corresponding quantized sub-band speech samples;

selecting at least one sub-band for encoding the time frame interval residual difference signals thereof responsive to the energy representative signals and the bit allocation signals of a plurality of the sub-bands;

generating a coded signal representative of the sequence of residual difference signals of the at least one selected sub-band of the time frame interval; and multiplexing the quantized speech samples, the energy signals of the sub-band portions and coded signal representing the residual difference of the at least one selected sub-band portions to form a coded signal representative of the speech pattern of the time frame interval.

7. A method of coding speech according to claim 6 wherein the step of generating the coded signal representative of the residual difference signals of the at least one selected sub-band of the present time frame interval comprises:

storing a plurality of fixed codes each having K+1 elements;

forming a vector signal having K+1 elements, each element corresponding to one of the residual difference signals of the selected sub-band portion responsive to the residual difference signals of the selected sub-band;

identifing the stored fixed code most closely matching the selected sub-band vector signal; and using the identified fixed code as the residual difference coded signal.

using the identified fixed code as the residual difference coded signal.

8. A method of coding speech according to claim 7 wherein each component of the stored fixed code is a Gaussian code having zero mean and unity variance.

9. A method of coding speech according to claim 8 wherein the step of selecting at least one sub-band for encoding the residual difference signals comprises:

generating a signal representative of an estimate of the residual difference of the sub-band reponsive to the bit allocation signal and the speech energy signal of each sub-band; and selecting at least the sub-band having the maximum residual difference estimate signal responsive to the residual difference estimate signals of the time frame interval.

10. A method of coding speech according to claim 9 wherein the step of identifying the stored fixed code most closely matching the selected sub-band vector signal comprises:

comparing the K+1 element residual difference vector signal of the at least one selected sub-band to each stored K+1 element fixed code representing individual residual difference estimate signals of the selected sub-band; and selecting the stored fixed code with the minimum difference between the element fixed code and the residual difference vector signal of the selected sub-band responsive to the output of the comparing step; and generating an index code identifying the selected fixed code responsive to the code selecting step.

11. An arrangement for decoding a signal representative of a speech pattern of a time frame interval wherein the signal includes a set of coded signals each representative of a sequence of $K+1$ quantized samples of one of a plurality of sub-band portions of the spectrum of the speech pattern, a set of signals each representative of the speech energy of one of the plurality of sub-band portions, and a set of coded signals each representative of residual difference signals of a selected sub-band portion of the spectrum of the speech pattern comprising:

means responsive to the speech energy signals of the plurality of sub-band portions of the time frame interval for generating a set of signals allocating a predetermined number of bits to each sub-band portion of the time frame interval;

means jointly responsive to the time frame interval speech energy signals and the bit allocation signals of a sub-band portion for converting the sub-band coded quantized signals into a sequence of restored replicas of sub-band quantized samples for the sub-band portion;

means responsive to the speech energy signals and the bit allocation signals of a plurality of sub-bands for determining at least one selected sub-band portion corresponding to one of the set of coded residual difference representative signals;

means responsive to the coded residual difference representative signals of the selected sub-band for generating the sequence of $K+1$ residual difference signals of the selected sub-band, means for combining the sequence of $K+1$ residual difference signals of the selected sub-band and the sequence of $K+1$ quantized samples of the selected sub-band to form a sequence of $K+1$ signals representative of the speech pattern sub-band sample signals;

means for increasing the sample rate of the speech pattern sub-band sample signals to twice a bandwidth of the spectrum of an originating pretransmission speech pattern;

means for restricting the spectrum of the increased sample rate sub-band quantized samples to its sub-band portion; and means for combining the spectrum restricted sub-band sample signals of the plurality of sub-bands to form a replica of the speech pattern of the time frame interval.

12. An arrangement for decoding a signal representative of a speech pattern of a time frame interval wherein the signal includes a set of coded signals each representative of the sequence of $K+1$ quantized samples of one of a plurality of sub-band portions of the spectrum of the speech pattern, a set of signals each representative of the speech energy of one of the plurality of sub-band portions, and a set of coded signals each representative of residual difference signals of a selected sub-band portion of the spectrum of the speech pattern according to claim 11 wherein the means for determining at least one selected sub-band portion corresponding to one of the set of coded residual difference representative signals comprises:

means responsive to the bit allocation and speech energy signals of the time frame interval for forming a set of signals representing an estimate of the time frame interval residual differences of each sub-band; and means for selecting at least one of the sub-bands having the largest residual difference estimate signal for the time frame interval.

13. An arrangement for decoding a signal representative of a speech pattern of a time frame interval wherein the signal includes a set of coded signals each representative of the sequence of $K+1$ quantized samples of one of a plurality of sub-band portions of the spectrum of the speech pattern, a set of signals each representative of the speech energy of one of the plurality of sub-band portions, and a set of coded signals each representative of residual difference signals of a selected sub-band portion of the spectrum of the speech pattern according to claim 12 wherein the means for generating the sequence of $K+1$ residual difference signals of the selected sub-band comprises:

means for storing a plurality of fixed codes each having $K+1$ elements;

means responsive to the coded signal corresponding to the selected sub-band for selecting one of the plurality of $K+1$ element fixed codes;

means for scaling the selected fixed code with the residual difference estimate signal of the selected sub-band to form the sequence of $K+1$ residual difference signals for the selected sub-band.

14. An arrangement for decoding a signal representative of a speech pattern of a time frame interval wherein the signal includes a set of coded signals each representative of the sequence of $K+1$ quantized samples of one of a plurality of sub-band portions of the spectrum of the speech pattern, a set of signals each representative of the speech energy of one of the plurality of sub-band portions, and a set of coded signals each representive of residual difference signals of a selected sub-band portion of the spectrum of the speech pattern according to claim 13 wherein each fixed code element is a Gaussian code having zero means and unit variance.

15. A method of decoding a signal representative of a speech pattern of a time frame interval wherein the signal includes a set of coded signals each representative of a sequence of $K+1$ quantized samples of one of a plurality of sub-band portions of the spectrum of the speech pattern, a set of signals each representative of the speech energy of one of the plurality of sub-band portions, and a set of coded signals each representative of residual difference signals of a selected sub-band portion of the spectrum of the speech pattern comprising;

generating a set of signals allocating a predetermined number of bits to each sub-band portion of a the time frame interval responsive to the speech energy signals of the plurality of sub-band portions of the time frame interval;

converting the sub-band coded quantized signals into a sequence of restored replicas of sub-band quantized samples for the sub-band portion jointly responsive to the time frame interval speech energy and the bit allocation signals of a sub-band portion;

determining at least one selected sub-band portion corresponding to one of the set of coded residual difference representative signals responsive to the speech energy signals and the bit allocation signals of a plurality of sub-bands;

generating the sequence of $K+1$ residual difference signals of the selected sub-band responsive to the coded residual difference representative signals of the selected sub-band;

combining the sequence of K+1 residual difference signals of the selected sub-band and the sequence of K+1 quantized samples of the selected sub-band to form a sequence of K+1 signals representative of the speech pattern sub-band sample signals;

increasing the sample rate of the speech pattern sub-band sample signals to twice a bandwidth of the spectrum of an originating pretransmission speech pattern;

restricting the spectrum of the increased sample rate sub-band quantized samples to its sub-band portion; and combining the spectrum restricted sub-band sample signals of the plurality of sub-bands to form a replica of the speech pattern of the time frame interval.

16. A method of decoding a signal representative of a speech pattern of a time frame interval wherein the signal includes a set of coded signals each representative of the sequence of K+1 quantized samples of one of a plurality of sub-band portions of the spectrum of the speech pattern, a set of signals each representative of the speech energy of one of the plurality of sub-band portions, and a set of coded signals each representative of residual difference signals of a selected sub-band portion of the spectrum of the speech pattern according to claim 15 wherein the step of determining at least one selected sub-band portion corresponding to one of the set of coded residual difference representative signals comprises:

forming a set of signals representing an estimate of the time frame interval residual differences of each sub-band responsive to the bit allocation and speech energy signals of the time frame interval; and selecting at least one of the sub-bands having the largest residual difference estimate signal for the time frame interval.

17. A method of decoding a signal representative of a speech pattern of a time frame interval wherein the signal includes a set of coded signals each representative of the sequence of K+1 quantized samples of one of a plurality of sub-band portions of the spectrum of the speech pattern, a set of signals each representative of the speech energy of one of the plurality of sub-band portions, and a set of coded signals each representative of residual difference signals of a selected sub-band portion of the spectrum of the speech pattern according to claim 16 wherein the step of generating the sequence of K+1 residual difference signals of the selected sub-band comprises:

storing a plurality of fixed codes each having K+1 elements;

selecting one of the plurality of K+1 element fixed codes responsive to the coded signal corresponding to the selected sub-band;

scaling the selected fixed code with the residual difference estimate signal of the selected sub-band to form the sequence of K+1 residual difference signals for the selected sub-band.

18. A method of decoding a signal representative of a speech pattern of a time frame interval wherein the signal includes a set of coded signals each representative of the sequence of K+1 quantized samples of one of a plurality of sub-band portions of the spectrum of the speech pattern, a set of signals each representative of the speech energy of one of the plurality of sub-band portions, and a set of coded signals each representative of residual difference signals of a selected sub-band portion of the spectrum of the speech pattern according to claim 17 wherein each fixed code element is a Gaussian code having zero mean and unit variance.

19. In a sub-band coder for processing a speech pattern having a prescribed bandwidth including, means for separating the spectrum of the speech pattern into a plurality of sub-band portions, means for sampling each sub-band portion at a predetermined rate, means for partitioning the sequence of samples of each sub-band portion into successive frame intervals, means for forming a signal representative of the speech energy of each sub-band portion of the time frame interval and means for supplying a signal allocating a prescribed number of bits to each sub-band of the time frame interval, means for coding the sequence of samples of each sub-band portion of the time frame interval into a sequence quantized digital signals in accordance with the bit allocation and speech energy signals of the sub-band portion means for forming a sequence of signals each representative of the residual difference between each sample and the quantized digital signal corresponding thereto, and means for combining the quantized digital signals of the plurality of sub-band portions and the speech energy representative signals into a coded signal representative of the time frame portion of the speech pattern wherein the improvement comprises:

means responsive to the speech energy representative and bit allocation signals of a plurality of said sub-band portions for selecting at least one sub-band to encode the sequence of residual difference signals;

means for forming a codes signal representative of the sequence of residual difference signals of the at least one selected sub-band portion; and means for adding the coded residual difference representative signal to the coded signal representative of the time frame portion of the speech pattern.

20. In a sub-band coder according to claim 19 wherein the sub-band selecting means comprises:

means responsive to the time frame interval speech energy and the bit allocation signals of each sub-band for generating a signal representative of an estimate of the speech energy of the residual difference signals of the sub-band; and means responsive to the residual difference estimate signals of the plurality of sub-bands for determining the at least one sub-band having the largest residual difference estimate signal.

21. In a sub-band coder according to claim 20 wherein means for forming a coded signal representative of the sequence of residual difference signals of the least one selected sub-band portion comprises:

means responsive to the residual difference signals of the selected sub-band for forming a vector signal having K+1 components, each component corresponding to one of the residual difference signals of the selected sub-band portion;

means for storing a plurality of fixed codes, each code having K+1 elements;

means for determining the fixed code having the closest similarity with the residual difference vector signal of the selected sub-band; and means for identifying the determined fixed code.

22. In a sub-band coder according to claim 21 wherein each fixed code element is a Gaussian code having zero mean and unit variance.

* * * * *